Oct. 13, 1942.  E. E. EICKMEYER ET AL  2,298,356
WATER SOFTENING APPARATUS
Original Filed Feb. 13, 1939   8 Sheets-Sheet 1

Fig.1

INVENTOR
EARL E. EICKMEYER
ANTHONY G. HORVATH
BY
ATTORNEYS

Oct. 13, 1942.　　E. E. EICKMEYER ET AL　　2,298,356
WATER SOFTENING APPARATUS
Original Filed Feb. 13, 1939　　8 Sheets-Sheet 2

INVENTOR
EARL E. EICKMEYER
ANTHONY G. HORVATH
BY
ATTORNEYS

INVENTOR
EARL E. EICKMEYER
ANTHONY G. HORVATH
BY
ATTORNEYS

Oct. 13, 1942.  E. E. EICKMEYER ET AL  2,298,356
WATER SOFTENING APPARATUS
Original Filed Feb. 13, 1939   8 Sheets-Sheet 6

INVENTOR
EARL E. EICKMEYER
ANTHONY G. HORVATH
BY
ATTORNEYS

Patented Oct. 13, 1942

2,298,356

UNITED STATES PATENT OFFICE 2,298,356

WATER SOFTENING APPARATUS

Earl E. Eickmeyer and Anthony G. Horvath, Dayton, Ohio, assignors to The Dayton Pump and Manufacturing Company, Dayton, Ohio, a corporation of Ohio Original application February 13, 1939, Serial No. 256,066. Divided and this application September 28, 1939, Serial No. 296,964

7 Claims. (Cl. 210—24)

This invention relates to water softening and water conditioning apparatus.

It is the object of this invention to provide a unitary control for the control of the successive operations of refilling, brining, washing and softening.

The particular object of the invention is the provision of a brine valve as an integral part of the single control valve.

It is also an object of the invention to provide means for the upward wash of the mineral bed during the refill period of refilling the brine tank.

It is an object to provide the brine tank with hard water immediately before the regenerating process and not afterwards, as heretofore has been the practice in the art. When the refilling operation takes place before the regenerating process, there is thereby compelled automatically the upward back wash and cleaning of the mineral bed.

It is a further object to provide a check valve in the injector throat to prevent the washed water which flows upwardly through the mineral from contaminating the clean hard water which flows through the jet and thence through the brine valve into the brine tank.

An additional feature of this invention is double washing of the mineral bed in opposite directions: the first wash is in the reverse direction to softening upwardly that carries sediment from the top of the mineral bed to drain during the refill operation, and the second wash is subsequent to brining in the reverse direction downwardly, whence the brine and any remaining sediment goes to drain. The advantage of this double washing is the removal of accumulated sediment on top of the filter softening body prior to brining to permit the active reaction of the brine directly on the magnesium and calcium salts without being impeded by any coating of sediment on the mineral.

The further object is to remove the free salts of magnesium and calcium with any accumulated sediment by the final washing after brining so that hard water when it is passed through the mineral to be softened will not be contaminated and can be actively softened by clean, regenerated mineral.

This application is a division of my application Serial No. 256,066, filed February 13, 1939, now Patent No. 2,265,520, dated December 9, 1941.

Referring to the drawings.

Referring to the drawings in detail, the following is a description of the process of washing, softening, brining and refilling.

Process

Referring to Figures 1, 9, 10, 11 and 12 in particular, 1 designates a tank containing the water softening mineral. Starting at the top of the body of mineral, there is a layer of iron-removing mineral 2, then a body of water softening mineral 3 which removes the magnesium and calcium and preferably also removes objectionable materials so far as taste and odor are concerned. Next is a layer of lake sand 4, then a layer of quartz 5, and finally a body of gravel 6. In this body of gravel is located a horizontally disposed perforated pipe 7 through which the liquid in the tank is withdrawn through the pipe 8, whence it enters the control valve 9, the details of which are hereinafter described.

This valve is connected with the pipe 10 which goes to drain for the discharge of the wash waters and brine waters. The city water or hard water line 11 is connected with the valve for supplying the water to be treated, which it passes through the valve and thence into the pipe 12 and through the distributor 13 into the top of the tank 1, whence it passes downwardly or upwardly as indicated by the arrows, depending upon the nature of the operation. The valve 9 is connected by the pipe 14 for the purpose of delivering brine 15 from the brine tank 16 to the mineral body to regenerate it. Thereafter the brine with the salts of magnesium and calcium and other foreign materials passes out to drain from the bottom of the tank. The brine tank is provided with a layer of gravel 17, a layer of salt 18, and the salt brine waters 15. The level of these waters is indicated by the pointer 19 on the shaft 20 having the float 21, which is a brine float floating on the brine 15. The salt level indicator is designated 22. It is mounted upon a shaft 23 which has an enlarged foot 24 resting on top of the salt 18.

Figures 9, 10:
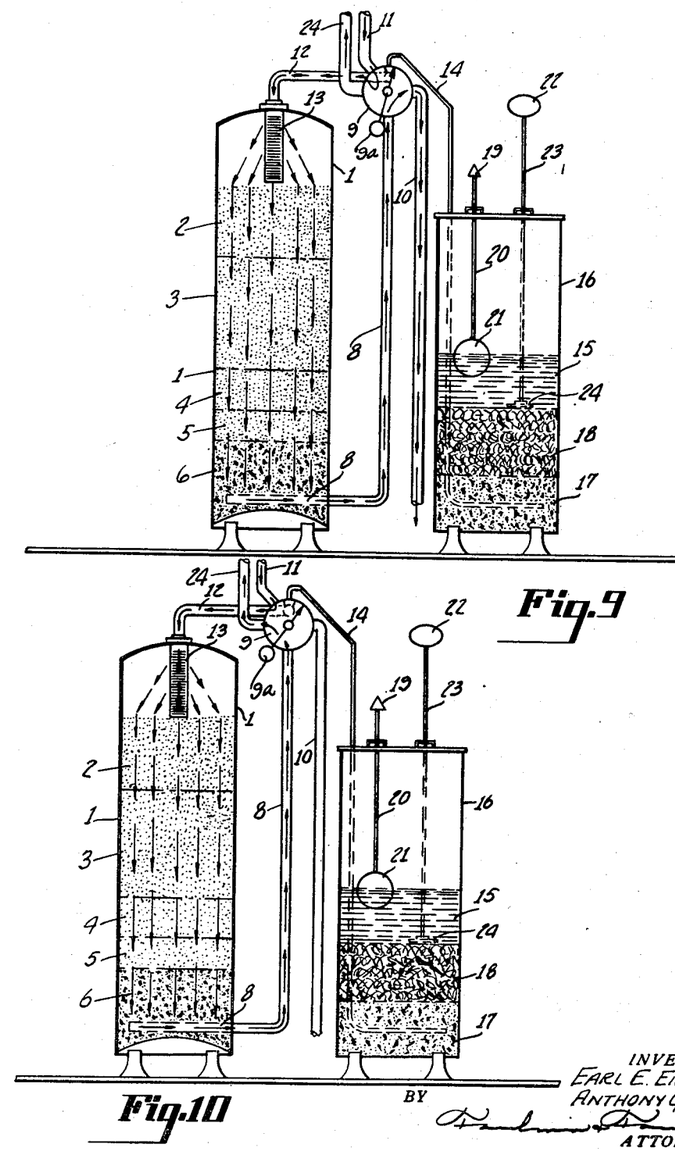
Figure 9 is a diagrammatic view showing the direction of flow of the water during washing.
Figure 10 is a similar view showing the direction of flow during softening.

Referring particularly to Figure 9, which illustrates the washing operation, the water from the hard water line 11 passes through the valve 9 into the top of the tank 1 and downwardly through the mineral to wash it of any remaining brine and foreign material. This waste water passes out through the pipe 8 and thence through the drain pipe 10 to the sewer. After this operation has been completed, which usually takes approximately 20 to 30 minutes, then the system is ready for the operation to soften water. The handle 9a of the valve 9 is moved into the position shown in Figure 10. In this position the incoming hard water proceeds as heretofore described, except that it is now diverted through the service pipe 24 so that softened water is delivered to the household or other place where it is consumed.

Figures 11, 12:
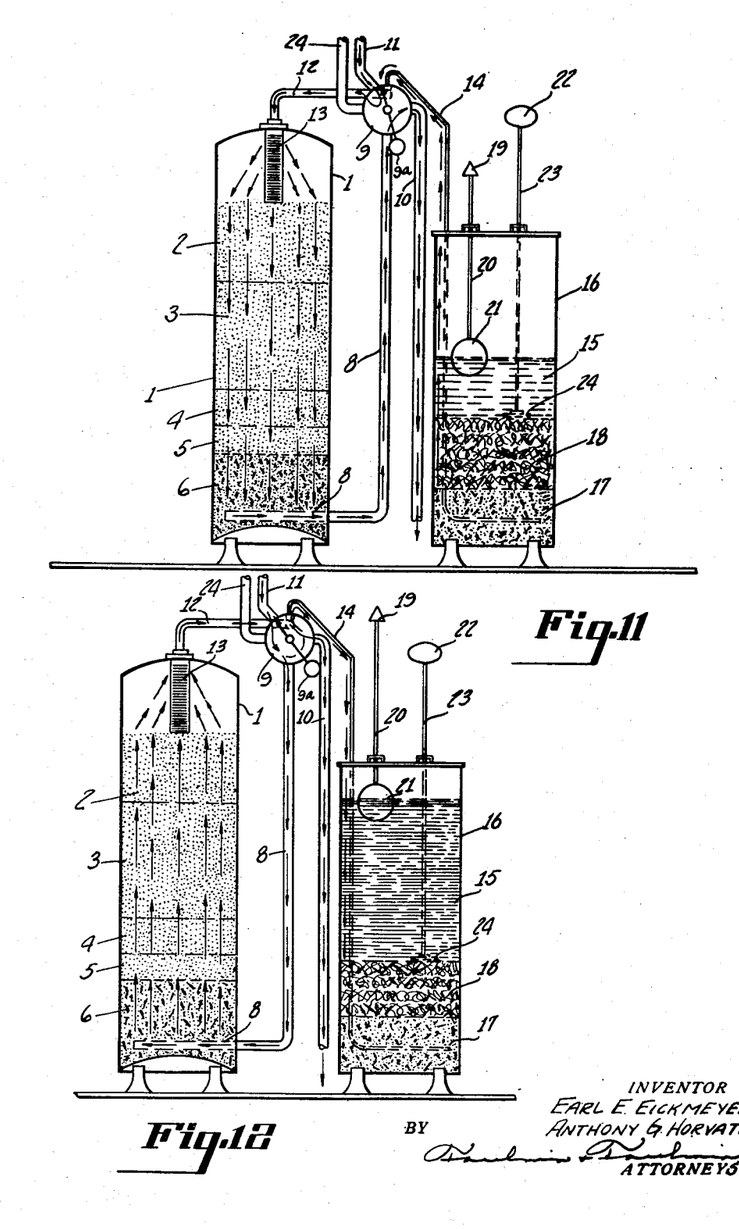
Figure 11 is a similar view showing the direction of flow during regeneration or brining.
Figure 12 is a similar view showing the direction of flow during the refilling.
Figure 13:
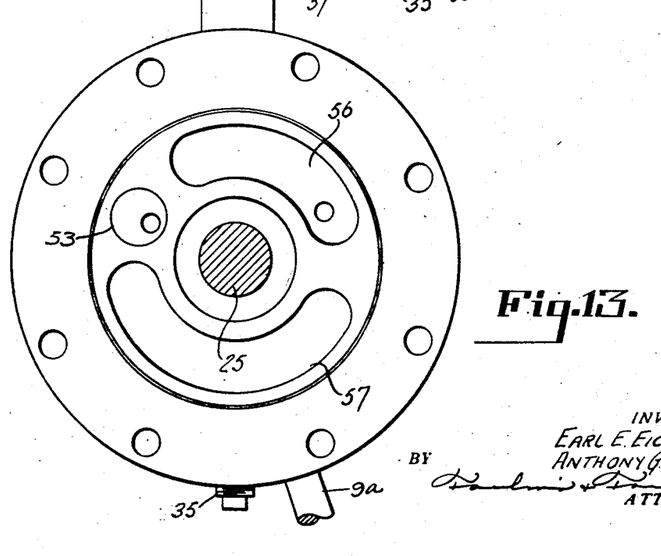
Figure 13 is a section on the line 13—13 looking in the direction of the arrows of Figure 4.

This continues until the water is no longer actively softened by the softening mineral 2, whereupon the valve handle 9a is moved into the position shown in Figure 12. The purpose of this is to refill the brine tank 16 so that the level of the water will reach that shown in Figure 12. During this period the hard water from the pipe 11 passes from the valve 9 downwardly through the pipe 8, upwardly through the mineral body in the tank, out the pipe 12 and thence to drain through the pipe 10, thereby washing the accumulation of sediment and other foreign materials out of the tank 1 from the top of the mineral where such materials have accumulated. If the water for washing were conducted downwardly, this foreign material would be drawn into the mineral. By reversing the direction of flow for this washing of the mineral during the refill operation, the mineral is entirely cleaned by reverse flow. At the same time a portion of the water from the line 11 passes through the pipe 14 into the brine tank 16 to refill the brine tank and provide a supply of brine for the brining operation.

Turning to Figure 11, the brining operation is brought about by moving the handle 9a to the position shown, in which position the brine is withdrawn from the tank 16 by the pipe 14 and delivered through the valve 9 to the top of the tank 1 through the pipe 12 and distributor 13. It passes down through the cleaned mineral, out the bottom of the tank 1, up the pipe 8, through the valve 9, and thence to drain through the pipe 10.

Thereafter the washing step of Figure 9 is repeated and then the valve is set in the position shown in Figure 10 for another softening operation.

One of the features of this invention is the dual washing of the mineral bed. It is washed upwardly in reverse direction after softening during refilling to carry away any accumulation of sediment on top of the mineral body, which acts as a filter. Then the reverse washing takes place after brining, which carries out the remaining brine and any remaining foreign materials. In this manner the mineral is thoroughly cleaned in both directions prior to brining and after brining so as not to contaminate or impede the regeneration operation, which would be the case if the mineral body were clogged with sediment that would prevent the ready attack of the brine upon the magnesium and calcium salts of the mineral.

Another advantage of this process is that the valve construction is so arranged that during the washing and refilling, there is no possibility of the discharged wash water getting into the brine tank to contaminate the brine with any sediment being washed away by the wash water.

It will be understood that a variety of different types of valves 9 may be employed which will perform these several operations and it is not desired to confine this invention to any particular mechanism.

However, this invention also comprehends novel features in a valve that has been found practically useful. These features are described hereinafter in connection with the detailed description of the valve and its method of operation, now that the general operation of the system has been described.

*Valve mechanism and method of operation*

Referring to the valve mechanism in detail, the valve consists of several major parts: a valve operating handle 9a which is mounted upon and rotates a shaft 25 on which is mounted a rotor 26, which operates within a cover 27 and which operates against the face 28 of a distribution head 29, the rear end of which is connected to the pipe 12 that in turn is connected to the top of the softener tank 1. The bottom of this distributor head is connected at 30 to the pipe 8, which is connected to the bottom of the softener tank 1. The right-hand side of this distributor head 29 is connected at 31 to the drain pipe 10. The left-hand end side of the distributor head is connected to the hard water pipe 11 at 32 and to the service pipe 24 at 33. The brine pipe 14 is connected through the union 34 to the top of the cover casing 27. The bottom of the cover casing 27 is provided with a plug 35 upon which is mounted a spring 36 that presses upwardly an indexing finger 37 into a shouldered portion 38 of the rotor 26, so that the positioning of the rotor at its several positions by the handle 9a will be indicated by this spring pressed plunger 37 which is adapted to be pressed into a series of depressions on the periphery of the rotor, one each to each position in which the rotor is set for the distribution of water. This rotor turns with the shaft 25 that is supported within the cover 27 in the bearing 39, which is provided with a packing 40 and packing gland 41. A pin mounted in the shaft 25 engages with the inside of the cover 27. The inner end of the shaft 25 is journaled in a recess 43 in one face of the distributor head 29.

Figure 6:
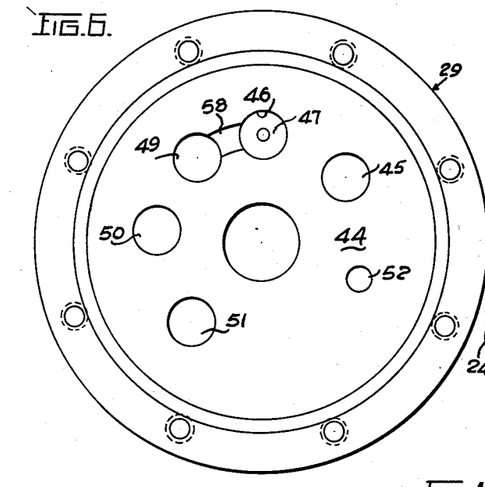
Figure 6 is a section on the line 6—6 of Figure 4 looking in the direction of the arrows.
Figures 7, 19:
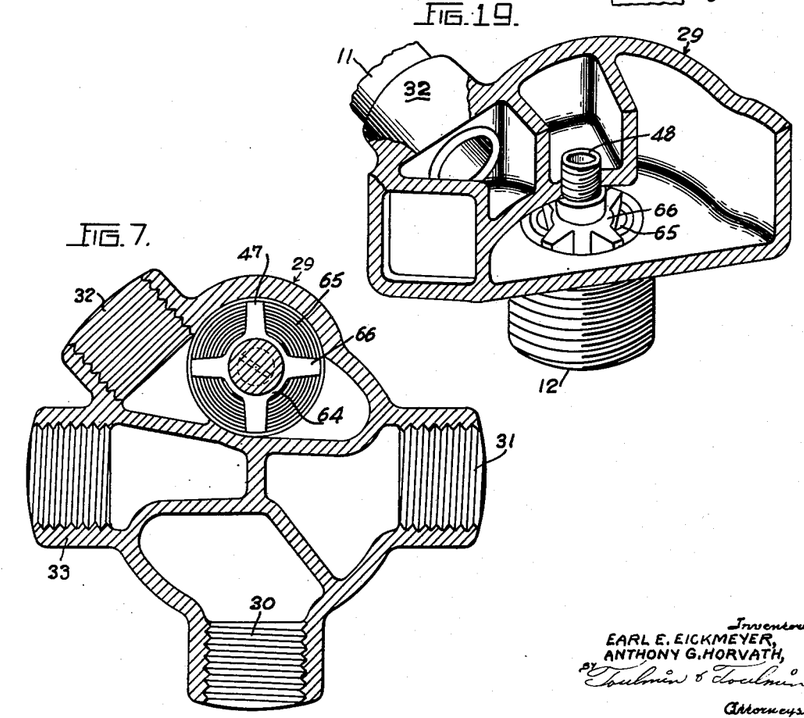
Figure 7 is a section on the line 7—7 of Figure 4 looking in the direction of the arrows.
Figure 19 is a perspective cross-sectional view of the distributor showing the relationship between the jet in the distributor and certain flow chambers.
Figure 8:
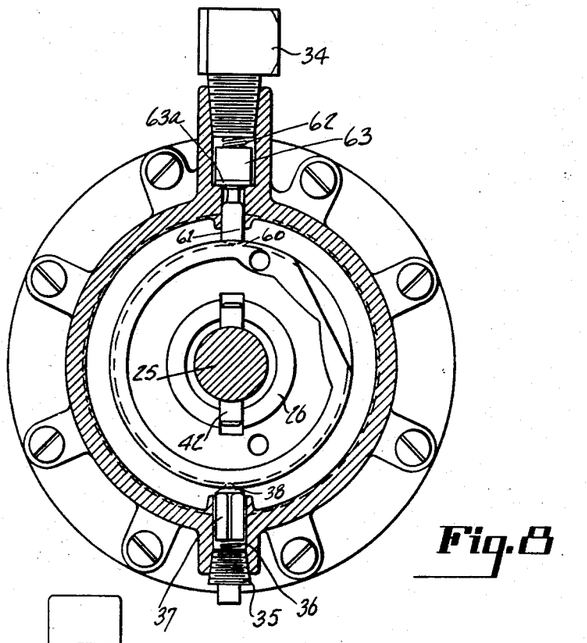
Figure 8 is a section on the line 8—8 of Figure 4 looking in the direction of the arrows.

By referring to Figures 6 and 14 to 17, the construction of the rotor, particularly with respect to its face adjacent the distributor head 29 and the positioning of the rotor with respect to the distributor ports, will be observed. In this connection Figure 6 shows the face of the distributor 44, which has a plurality of ports which cooperate with the rotor grooves. The relative positioning of the rotor grooves with respect to the distributor ports determines the distribution in this valve of the fluid. The port 45 in the distributor 29 communicates with the top of the softener through pipe 12. Port 46 in the distributor has mounted therein the jet device 47 used in connection with the injector 48, as will be herein described. The port 49 communicates with the hard water line 11. The port 50 communicates with the service pipe 24. The port 51 communicates with the pipe 8 leading to the bottom of the softener. The port 52 communicates with the drain pipe 10.

Figure 1:
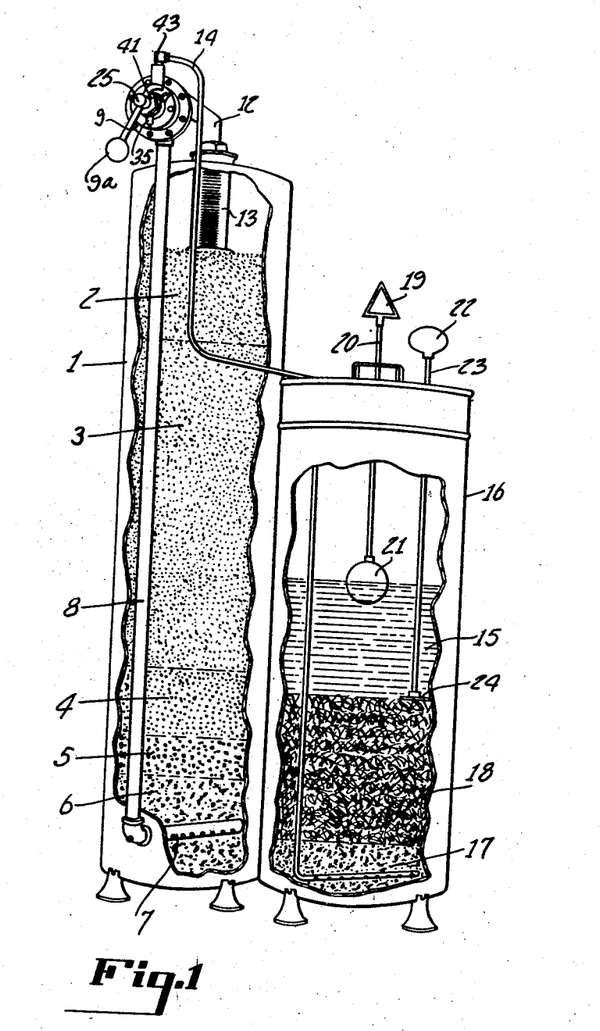
Figure 1 is an outside elevation partially broken away to show the general arrangement of the apparatus.
Figures 2, 3:
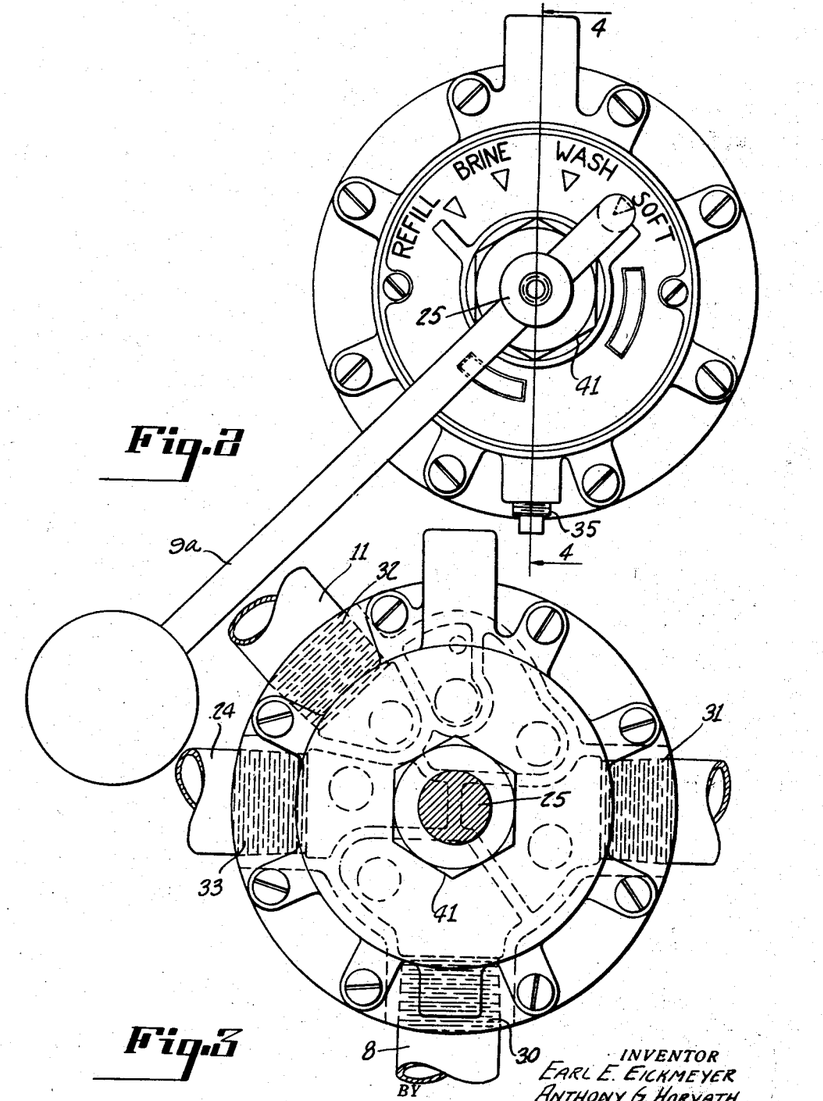
Figure 2 is a detailed front elevation of the single control valve.
Figure 3 is a front elevation thereof with the rotor shaft in section showing in dotted lines the compartments and ports in the valve.
Figures 4, 5:
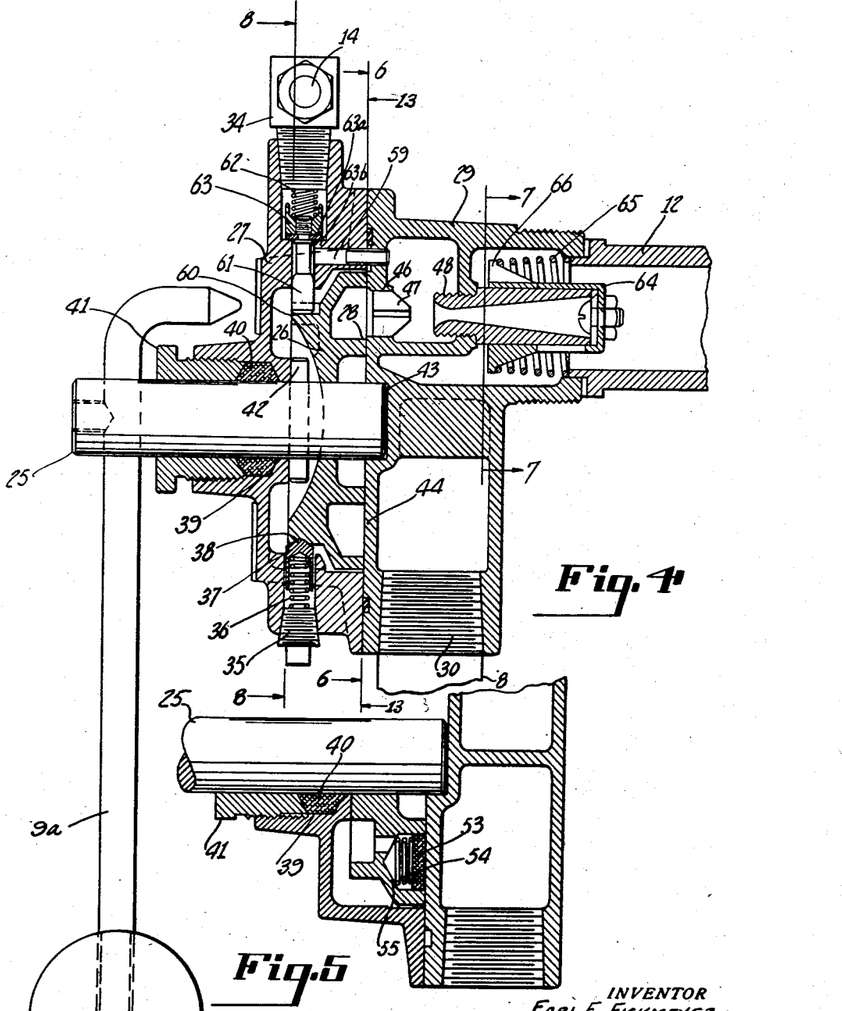
Figure 4 is a section on the line 4—4 of Figure 2.
Figure 5 is a detailed section showing a modification of the valve structure.
Figure 14:
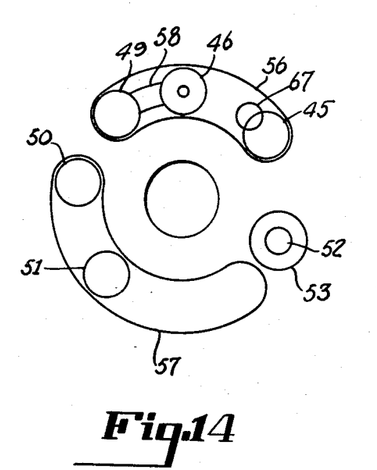
Figure 14 is a diagrammatic view showing the arrangement of the rotor grooves with respect to the distributor ports when the rotor is set in the position for the softening operation, as shown in Figure 10.

Referring to Figures 10 and 14, which illustrate the softening position of the mechanism, the hard water is connected to the top of the softener 1 through the pipe 11. The bottom of the softener 1 is connected by the pipe 8 to the service line 24. The drain 10 is positively closed by a valve mechanism hereinafter described but illustrated particularly in Figure 5, consisting of the spring-pressed plate 53, which is spring pressed by the spring 54, both the plate 53 and spring 54 being mounted within a chamber 55 in the rotor 27. The parts are so arranged as to bring about down flow of the hard water through the mineral bed in the softener tank 1. In such a position (refer to Figure 14) it will be seen that the rotor groove 56 bridges the ports 45, 46 and 49, while the groove 57 bridges the ports 50 and 51. This permits the water to flow as indicated by the arrows diagrammatically in Figure 10.

Figure 15:
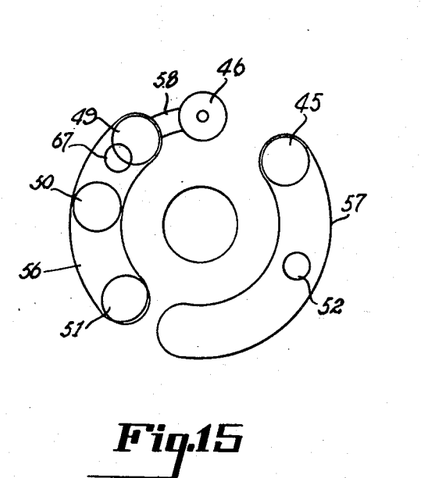
Figure 15 is a similar view showing the parts in position to bring about the refilling operations as shown in Figure 12.

Referring to the refill position of Figure 12 and to Figure 15, which shows diagrammatically the position of the rotor with respect to the distributor during refilling, it will be observed that the groove 56 now bridges the hard water port 49, the service port 50 and the port 51 leading to the bottom of the softener. The jet port 46 is connected by the passageway 58. The groove 57 spans the port 45 and the port 52. In this position the hard water pipe 11 is connected to the jet 47 through the milled slot 58, to the service line 24 and to the bottom of the softener 1 by the pipe 8. The top of the softener 1 is connected through ppe 12 to the drain pipe 10. The flow through the mineral bed is upward. This washes out the sediment from the top of the mineral bed direct to drain without any of this dirty water getting into the refill water for the brine tank. At the same time hard water is being delivered from the pipe 11 through the valve to the pipe 14 to refill the brine tank 16 with additional water to provide another supply of brine for the regeneration operation that will next occur. The hard water for this purpose enters the port 49, passes through the passageway 58, makes its exit through the jet 47 and thence through the passageway 59 into the pipe 14. In order to do this, the cam shoulder 60 on the periphery of the rotor 27 has lifted the pin 61 against the spring 62 and has lifted the valve member 63.

It will be noted that the groove 57 only connects the top of the softener through the port 45 from which the dirty water is moving to the drain 53 and there is no way by which this dirty water could be introduced into the brine tank 16.

Figure 16:
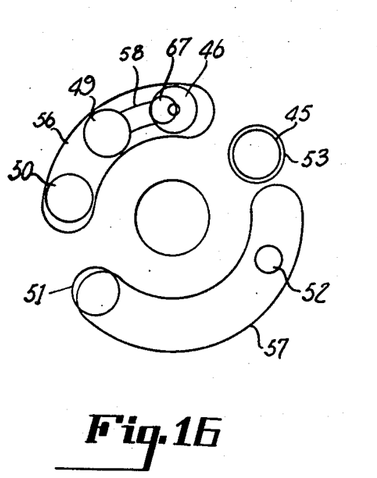
Figure 16 is a similar view showing the parts in position for applying brine to the mineral as in Figure 11.

Referring to Figures 11 and 16, which have to do with the brining position, the groove 57 of the rotor spans the drain opening 52 and the bottom of the softener opening 51. The recess 53 is over the opening 45 leading to the top of the softener. The recess 56 spans the jet opening 46, the hard water opening 49 and the service opening 50. By this arrangement the city water or hard water is connected to the service line for the dwelling using the soft water and the jet opening 46 is supplied with water so as to induce the flow of brine from the brine pipe 14 through the injector to the top of the softener, whence the brine passes through the mineral tank 1, out the bottom through the pipe 8, into the groove 57, thence through the drain opening 52 into the drain pipe 10 to the sewer. The force of this injected water passing through the injector 48 lifts the cover sleeve 64. This cover over the injector is normally closed by the spring 65 pressing against the member 66. The opening to the brine line 14 is effected by the cam surface 60 lifting the pin 61 and thereby opening the valve 63 against the spring 62. This valve has a hard rubber seat 63a engaging with the soft rubber seat 63b, so as to form a tight seal when the valve is closed. In the event the soft rubber wears away, the hard rubber still provides a yielding seal. This is essential to prevent any leakage of water into the brine tank when it is not being refilled because otherwise it might overflow.

Figure 17:
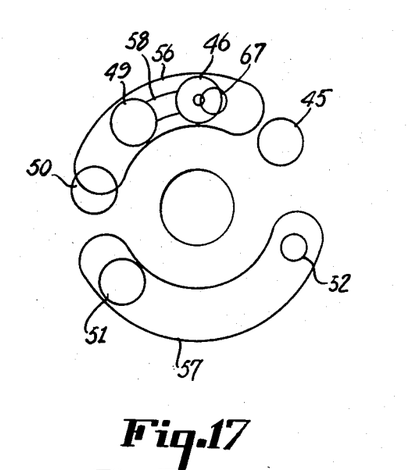
Figure 17 is a similar view showing the parts in washing position such as shown in Figure 9.
Figure 18:
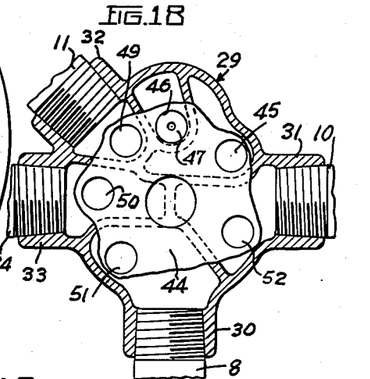
Figure 18 is a cross-sectional view of the distributor showing the relationship between the distributor ports and the chambers.

Referring to Figures 9 and 17, which illustrate the washing operation, the rotor groove 56 spans the jet opening 46, the hard water line 49, and the service line 50. The groove 57 spans the bottom of the softener line 51 and the drain opening 52. In this position the hard water is connected to the service line and to the injector jet 46. The bottom of the softener is connected by the pipe 8 through the groove 57 to the drain 52. The water is flowing downwardly at this time. In this way the household or other building connected to the serivce line is being supplied with hard water while the washing operation is washing the accumulated brine and salts of magnesium and calcium from the mineral out to the sewer.

It will be understood that the rotor 26 has water pressure on the back or left-hand face (Figure 4) to cause it to press firmly against the face 28 of the distributor. This is effected by having the water pass through the port 67 from the front of the rotor to behind it.

It will be understood that it is desired to comprehend within this invention such modifications as come within the scope of the claims and the invention.

Having thus fully described our invention, what we claim as new and desire to secure by Letters Patent, is:

1. In a distributing valve for a water softening system, the combination of a distributing head, a rotor in engagement with said distributing head and having fluid passageways therein, a cover cooperating with said distributing head to enclose said rotor, means for rotating said rotor, a hard water inlet in said distributing head, said distributing head having a plurality of ports for communication with said passageways in said rotor and a plurality of outlet ports for communication with the water softening system with which the distributing valve is associated, said ports and passageways providing means for conducting fluid flow through the distributing valve into the water softening system with which the valve is associated, a brine inlet passage for conducting brine to said distributing head, a control valve in said brine passageway, and means actuated by said rotor for opening and closing said brine control valve.

2. In combination, in a single control water softener valve, a distributing head, a rotor in engagement with said distributing head and having a plurality of passageways therein, a cover cooperating with said distributing head to enclose said rotor, means for rotating said rotor, a hard water inlet in said head, passageways in said rotor and said distributing head for conducting water from said hard water inlet through said rotor and head, said passageways in said head being adapted to be connected to a service line a drain line and softening tank lines, jet means associated with one of the passageways in said rotor and with one of the passageways in said distributing head, an injector associated with said jet means, a brine inlet passage connected to said distributor for conducting brine adjacent to said injector for passage therethrough, valve means in said brine passage for normally closing the same, and means associated with said rotor for actuating said valve upon rotation of said rotor for operating said brine valve.

3. In combination, in a single control water softening valve, a cover having a chamber therein, a distributor mounted on one face of said cover to close said chamber, a rotor rotatably supported within said chamber between the cover and said distributor and in engagement with said distributor, a hard water inlet in said distributor, said rotor having a plurality of arcuate passageways on the face thereof adjacent said distributor, said distributor having a plurality of passageways therein for cooperation with said rotor passageways for conducting fluid from said hard water inlet through said rotor and distributor, said passageways in said distributor being adapted to be connected to a service line a drain line and softening tank lines, a brine inlet passage connected to said distributor for conducting brine to one of said passages in said distributor, a valve in said brine inlet passage, cam means on the other face of said rotor to position the same and to actuate said brine valve, means actuated by said rotor cam means for opening said valve, and an injector associated with said distributor and brine valve.

4. In combination in a water softening control valve, a distributing head, a cover for said head, a rotor positioned between said cover and said head in engagement with said head, means for rotating said rotor, a hard water inlet in said head, passageways in said rotor and said head for conducting and directing the flow of fluid through the valve, said passageways in said head being adapted to be connected to a service line a drain line and softening tank lines, a brine inlet passage connected to said distributor and in communication with one of said flow conducting and directing passageways therein, a valve in said brine passage, cam means on said rotor, and means actuated by said cam means for operating said brine valve.

5. In combination in a water softening control valve, a distributing head, a cover for said head, a rotor positioned between said cover and said head in engagement with said head, means for rotating said rotor, a hard water inlet in said head, passageways in said rotor and said head for conducting and directing the flow of fluid through the valve, said passageways in said head being adapted to be connected to a service line a drain line and softening tank lines, a brine inlet passage connected to said distributor and having a portion thereof adjacent said rotor, said brine inlet communicating with one of said flow conducting and directing passageways in said distributor, a valve in said brine inlet passage and disposed in the portion of the brine inlet passage that is adjacent said rotor, means yieldingly retaining said valve in said closed position, cam means on said rotor, and means actuated by said cam means upon rotation of said rotor for opening said valve.

6. In combination, in a single control water softening valve, a hard water inlet in said valve, a cover having a chamber therein, a distributor mounted on one face of said cover to close said chamber, a rotor rotatably supported in said cover within said chamber between said cover and said distributor and in engagement with said distributor, said rotor having a plurality of annular passageways on the face thereof adjacent said distributor, said distributor having a plurality of ports adapted to communicate with the passageways in said rotor and a plurality of outlet ports in said passageways adapted to suitably connect the distributor to a service line a drain line and softening tank lines, cam means on said rotor, a brine line connected to said distributor, a valve therein, spring means for normally closing said valve, and means operatively connecting said rotor and said valve to open the same upon rotation of said rotor.

7. In a single control water softener valve, a stator having a plurality of chambers, a wall joining said chambers and forming a stator face for said stator, a plurality of ports in said stator face one of which communicates with each of said chambers, an outlet port in the wall of each of said chambers adapted to connect to a service line a drain line and softening tank lines, one of said chambers providing a hard water inlet chamber, a rotor having one face contacting said stator face and having grooves in its contacting face adapted to cooperate with said ports to variously interconnect the same to direct water flow from the hard water inlet chamber, a jet device mounted in said stator face in communication with one of said chambers and adapted to project a jet of liquid rearwardly, one of the grooves in said rotor connecting said jet device at all times with a supply of liquid to be jetted therein, an injector behind said jet device in communication with a chamber positioned in said stator rearwardly of said jet, one of said ports having its cooperating chamber in free communication with said rearward chamber, a chamber in said stator between said jet device and said injector through which liquid is sucked by said injector and jet device and into which said jet is received when said injector is closed off, check valve means in operative association with said injector normally urged to close said injector, said valve being opened by the force of said jet when liquid is flowing rearwardly in said rearward chamber and closed when liquid is flowing forwardly in said rearward chamber, an inlet and outlet port in fluid communication with said chamber between said jet and said injector to supply brine thereto to be sucked by said jet device and injector when said injector is open and to receive therefrom liquid supplied by said jet when said injector is closed off, valve means in said inlet and outlet port, cam means operated concomitantly with rotation of said rotor, and means extending between said cam means and said valve for operating said valve means.

EARL E. EICKMEYER.
      ANTHONY G. HORVATH.